United States Patent
Tamura et al.

(10) Patent No.: US 9,197,785 B2
(45) Date of Patent: Nov. 24, 2015

(54) OPERATION DEVICE, OPERATION METHOD, AND IMAGE FORMING APPARATUS INCLUDING THE OPERATION DEVICE

(71) Applicant: KYOCERA Document Solutions Inc.

(72) Inventors: Takashi Tamura, Osaka (JP); Satoshi Kawakami, Osaka (JP); Yoshifumi Okabayashi, Osaka (JP); Emi Tennichi, Osaka (JP)

(73) Assignee: Kyocera Document Solutions Inc. (JP)

( * ) Notice: Subject to any disclaimer, the term of this patent is extended or adjusted under 35 U.S.C. 154(b) by 0 days.

(21) Appl. No.: 13/894,141

(22) Filed: May 14, 2013

(65) Prior Publication Data
US 2013/0314724 A1 Nov. 28, 2013

(30) Foreign Application Priority Data
May 25, 2012 (JP) .................................. 2012-119439

(51) Int. Cl.
*H04N 1/393* (2006.01)
*H04N 1/387* (2006.01)

(52) U.S. Cl.
CPC ............. *H04N 1/393* (2013.01); *H04N 1/3875* (2013.01)

(58) Field of Classification Search
USPC .......... 358/1.2, 1.9, 1.11, 3.27, 1.18; 345/472
See application file for complete search history.

(56) References Cited

U.S. PATENT DOCUMENTS

| 8,576,428 | B2 * | 11/2013 | Nitta | 358/1.15 |
|---|---|---|---|---|
| 2010/0245906 | A1 * | 9/2010 | Nitta | 358/1.15 |
| 2011/0242600 | A1 * | 10/2011 | Yanagawa | 358/1.15 |
| 2011/0279392 | A1 * | 11/2011 | Yamaguchi et al. | 345/173 |
| 2012/0140279 | A1 * | 6/2012 | Takasaki et al. | 358/1.15 |
| 2012/0182569 | A1 * | 7/2012 | Lee | 358/1.13 |
| 2013/0100463 | A1 * | 4/2013 | Park et al. | 358/1.2 |
| 2013/0275422 | A1 * | 10/2013 | Silber et al. | 707/728 |
| 2013/0311949 | A1 * | 11/2013 | Shimadate | 715/838 |
| 2014/0092427 | A1 * | 4/2014 | Nakamura et al. | 358/1.15 |

FOREIGN PATENT DOCUMENTS

| JP | H09-037063 | 1/1997 |
|---|---|---|
| JP | 2007-074540 | 3/2007 |
| JP | 2009-232154 | 10/2009 |

* cited by examiner

Primary Examiner — Jerome Grant, II

(57) ABSTRACT

An operation device which displays a document preview image on a paper sheet preview image, includes: a changing unit which changes a size of document image data corresponding to the document preview image in accordance with a movement amount and a movement direction when a user touches a part of the document preview image and moves the touched part; a determining unit which determines whether or not a vertical size and a horizontal size of the document preview image after the change are larger than a vertical size and a horizontal size of a largest paper sheet preview image; and an enlargement continuous shooting setting unit sets an enlargement continuous shooting mode if it is determined that the vertical size and the horizontal size of the document preview image are larger than the vertical size and the horizontal size of the largest paper sheet preview image.

9 Claims, 11 Drawing Sheets

OPERATION DEVICE, OPERATION METHOD, AND IMAGE FORMING APPARATUS INCLUDING THE OPERATION DEVICE

CROSS-REFERENCE TO RELATED APPLICATIONS

This application relates to and claims priority rights from a Japanese Patent Application No. 2012-119439, filed on May 25, 2012, the entire disclosures of which are hereby incorporated by reference herein.

BACKGROUND

1. Field of the Invention

The present disclosure relates to an operation device, an operation method, and an image forming apparatus including the operation device.

2. Description of the Related Art

An image forming apparatus such as a multifunction peripheral having a copy function is used in a lot of output manners such as output in office use, output of a designed layout, and output to a paper sheet with a specific size, not standard sizes.

However, in order to obtain desired output in such output manners, a user firstly performs a copy, checks a default print position, and manually changes a position of a document so as to output the document image at a desired position if the default print position is not proper. Therefore, it is easy to occur waste of a paper sheet due to such a copy error.

Further, when a user can not (or does not want to) perform draft printing, for example, when the user uses a specific paper sheet, the user performs draft printing on a substitute paper sheet and therefore, the user may not obtain a desired output, because another specific paper sheet is not available for draft printing before printing on the specific paper sheet.

Furthermore, if a user performs printing with a document size and an output paper sheet size of which a combination is not general but familiar to the user, the user has to change the setting for using the combination every time.

To solve such problems, for example, an image forming apparatus puts and displays an image to be copied on a recording medium in order for a user to confirm a result of image forming in advance. Further, another image forming apparatus performs magnification adjustment for an image to be copied, displays a laid-out position relation between the image to be copied and a recording medium, and generates a copy image to be outputted.

However, in the aforementioned apparatuses, it is not possible for a user to position a document image on a desired recording medium in a desired layout and check the positioned document image itself. Further, even if it is possible to adjust a recording medium, a document image, and its output position in a certain manner, there are no ways to register the combination of them, and therefore, even when a user performs output of different document images in a same layout plural times, the user has to input the setting every time of the output.

To solve such problems, an image forming apparatus includes an image scanning unit, an image memory, an image recording unit, an operation unit, a display unit, and a control unit; and the operation unit includes a confirmation-start input unit to start an action for confirmation of a position relation between an output paper sheet and a document image, and a position-change input unit to change the position of the document image. In this image forming apparatus, on the basis of an operation to the confirmation-start input unit, the control unit stores image information obtained by the image scan in the image memory, generates an output image by putting an image of the image information on an image of a selected recording medium at a position according to the position change, and controls the display unit to display the output image. It is described that therefore a user can properly and quickly output a document image to be outputted at a desired position on an output paper sheet to be used.

Further, an image copying apparatus includes an image inputting device which converts an image on a document to an image signal; an image outputting device which outputs the converted image signal onto a paper sheet; a display unit which displays an image; and a control device which control the whole. In this image copying apparatus, the control device includes a preview screen display unit which displays the image on the document on a preview screen of the display device; and a layout screen display unit which specifies any area on the preview screen, performs enlargement, reduction, or rotation of the specified area, and performs a layout edit action indicating a printing position on a layout screen of the display device. It is described that therefore when an image obtained by combining plural document images is formed on a paper sheet, some works such as cut-and-paste and copying again are not required, and consequently the image copying apparatus enables to gain work efficiency and copy image quality.

Further, another image forming apparatus displays a preview image on a display unit, and the preview image indicates an image forming status of a document image scanned by an image scanning unit. This image forming apparatus includes an operation unit which receives an action instruction; and a control unit which displays the preview image on a medium frame of an image forming medium, and performs enlargement or reduction of the preview image in accordance with a movement of a preview image frame of the preview image when the operation unit receives an action instruction of the movement. It is described that therefore a user can intuitively adjust magnification of enlargement or reduction of an image formed on an image forming medium, and can easily perform image forming at a desired position on an image forming medium, and consequently the user can easily perform image forming on an image forming medium for an image obtained by enlarging or reducing only a desired part of the document image.

Although the aforementioned apparatus enables a user to input magnification (vertical magnification or horizontal magnification) of image data of a document, namely a size (a vertical size or a horizontal size), the input may result in image deformation of the image data of the document and low image quality due to the magnification change.

Further, since in general the changed preview image is not displayed in the magnification change (the size change) of the image data of the document, it is hard for a user to intuitively image a printed matter obtained after the change. For example, if a user sets an enlargement continuous shooting in which an enlarged document image is formed on plural combined paper sheets, it is very hard for the user to image a printed matter obtained after the change.

The setting of enlargement continuous shooting is an effective function when a size of a document image is set to be larger than a predetermined paper sheet size, but most users do not know enlargement continuous shooting in advance, and therefore enlargement continuous shooting is not effectively utilized.

SUMMARY

An operation device according to an aspect of the present disclosure is an operation device which displays on a touch panel a document preview image corresponding to document image data of a predetermined document size on a paper sheet preview image corresponding to a paper sheet with a predetermined paper sheet size, and includes the following configuration.

This operation device includes a changing unit configured to change a size of the document image data corresponding to the document preview image in accordance with a movement amount and a movement direction when a user touches a part of the document preview image and moves the touched part; and a determining unit configured to determine whether or not a vertical size and a horizontal size of the document preview image after the change by the changing unit are larger than a vertical size and a horizontal size of a largest paper sheet preview image corresponding to a settable largest paper sheet size. Further, this operation device includes an enlargement continuous shooting setting unit configured to set an enlargement continuous shooting mode if it is determined that the vertical size and the horizontal size of the document preview image are larger than the vertical size and the horizontal size of the largest paper sheet preview image. The enlargement continuous shooting mode divides a document image based on the document image data corresponding to the document preview image into plural divisional images, enlarges the respective divisional images, and forms the enlarged divisional images on respective paper sheets.

An operation method according to an aspect of the present disclosure is an operation method of an operation device which displays on a touch panel a document preview image corresponding to document image data of a predetermined document size on a paper sheet preview image corresponding to a paper sheet with a predetermined paper sheet size, and includes the following steps.

This operation method includes the steps of changing a size of the document image data corresponding to the document preview image in accordance with a movement amount and a movement direction when a user touches a part of the document preview image and moves the touched part; and determining whether or not a vertical size and a horizontal size of the document preview image after the change are larger than a vertical size and a horizontal size of a largest paper sheet preview image corresponding to a settable largest paper sheet size. Further, this operation method includes the step of setting an enlargement continuous shooting mode if it is determined that the vertical size and the horizontal size of the document preview image are larger than the vertical size and the horizontal size of the largest paper sheet preview image. The enlargement continuous shooting mode divides a document image based on the document image data corresponding to the document preview image into plural divisional images, enlarges the respective divisional images, and forms the enlarged divisional images on respective paper sheets.

These and other objects, features and advantages of the present invention will become more apparent upon reading of the following detailed description along with the accompanied drawings.

DETAILED DESCRIPTION

In the following part, referencing to the attached drawings, explained is an image forming apparatus including an embodiment of an operation device of the present disclosure.

Operation Device and Image Forming Apparatus

In the following part, an image forming apparatus according to an embodiment of the present disclosure is explained.

Figure 1:
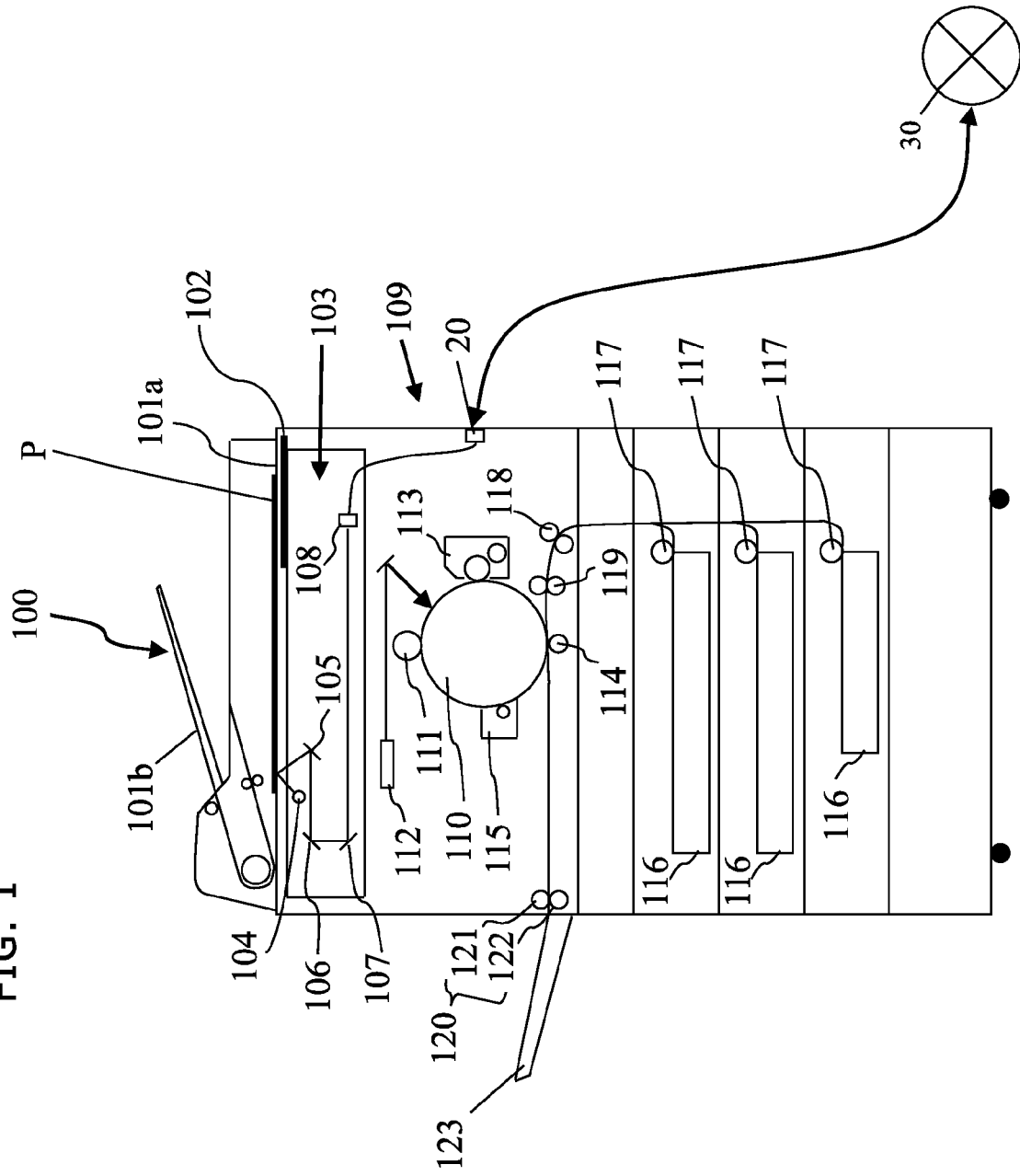
FIG. 1 shows a schematic diagram which indicates a whole internal configuration of a multifunction peripheral according to an embodiment of the present disclosure.

FIG. 1 shows a schematic diagram which indicates a whole internal configuration of a multifunction peripheral according to an embodiment of the present disclosure. This image forming apparatus is, for example, a printer, a scanner, a multifunction peripheral which includes a printer, a copier, a scanner, a facsimile and so forth, or the like, and has a copy function, a scanner function, a facsimile function, a printer function, and so forth. In the following part, when a user uses a copy function, an action of a multifunction peripheral (MFP) 100 is briefly explained.

Firstly, when a user uses the multifunction peripheral 100, the user puts a document P on a platen glass 101a or an auto document feeder unit 101b, and inputs a setting of the copy function to an operation unit 102. This operation unit 102 displays a print screen (e.g. an initial screen) of the copy function provided by the multifunction peripheral 100, and plural setting item keys of the copy function which can be selected. The user inputs a setting condition of the copy function through the print screen.

After inputting the setting condition, the user presses a start key arranged in the operation unit 102 to start a process of the copy function in the multifunction peripheral 100.

After the multifunction peripheral 100 starts the process of the copy function, in an image scanning unit 103, light irradiated from a light source 104 reflects on a document put on the platen glass 101a. The reflection light is guided to an image sensor element 108 by mirrors 105, 106 and 107. The guided light is converted to an electric signal by the image sensor element 108, and image data of the document is generated by performing basic processes such as a correction process, an image quality process, and a compression process for the electric signal.

The image data may be obtained from a communicating unit 20 connected to the image sensor element 108. The communicating unit 20 is capable of communicating with a predetermined terminal device via a network 30, and the image data may be image data transmitted from this terminal device.

An image forming unit 109 is a driving unit which transfers an image based on the image data as a toner image. The image forming unit 109 includes a photo conductor drum 110. The photo conductor drum 110 rotates at a constant speed in a predetermined direction, and in periphery of it, devices and units are arranged such as a charging device 111, an exposure unit 112, a developing device 113, a transferring device 114, and a cleaning unit 115.

The charging device 111 uniformly charges a surface of the photo conductor drum 110. The exposure unit 112 forms an electrostatic latent image on the charged surface of the photo conductor drum 110 by irradiating a laser light based on the image data. The developing device 113 forms a toner image by attaching toner to the electrostatic latent image while it is moving. The formed toner image is transferred to a recording medium (e.g. a sheet) by the transferring device 114. The cleaning unit 115 removes residual unnecessary toner on the surface of the photo conductor drum 110. A series of these processes is performed while the photo conductor drum 110 is rotating.

The sheet is fed and transpored from plural paper feed cassettes 116. To transport the sheet, the sheet is fed from any one of the paper feed cassettes 116 to a transportation path by a pickup roller 117. Sheets with different paper types are stored in the respective paper feed cassettes 116, and fed is a sheet with a paper type corresponding to a setting value in the aforementioned setting condition.

The sheet fed into the transportation path is transported into between the photo conductor drum 110 and the transferring device 114 by a transporting roller 118 and a registration roller 119. On the transferred sheet, a toner image is transferred by the transferring device 114, and then the sheet is transferred to a fuser device 120.

When the sheet on which the toner image has been transferred passes between a heating roller 121 and a pressuring roller 122 in the fuser device 120, heat and pressure are applied to the toner image, and consequently, the toner image is fixed on the sheet. An optimal heating value corresponding to the paper type is set to perform fixing properly. When the toner image is fixed on the sheet, the image forming is finished, and the sheet on which the toner image has been fixed is outputted through the fusing device 120 to an output tray 123, on which the sheet is piled and stored.

In the aforementioned manner, the multifunction peripheral 100 provides the copy function to a user.

Figure 2:
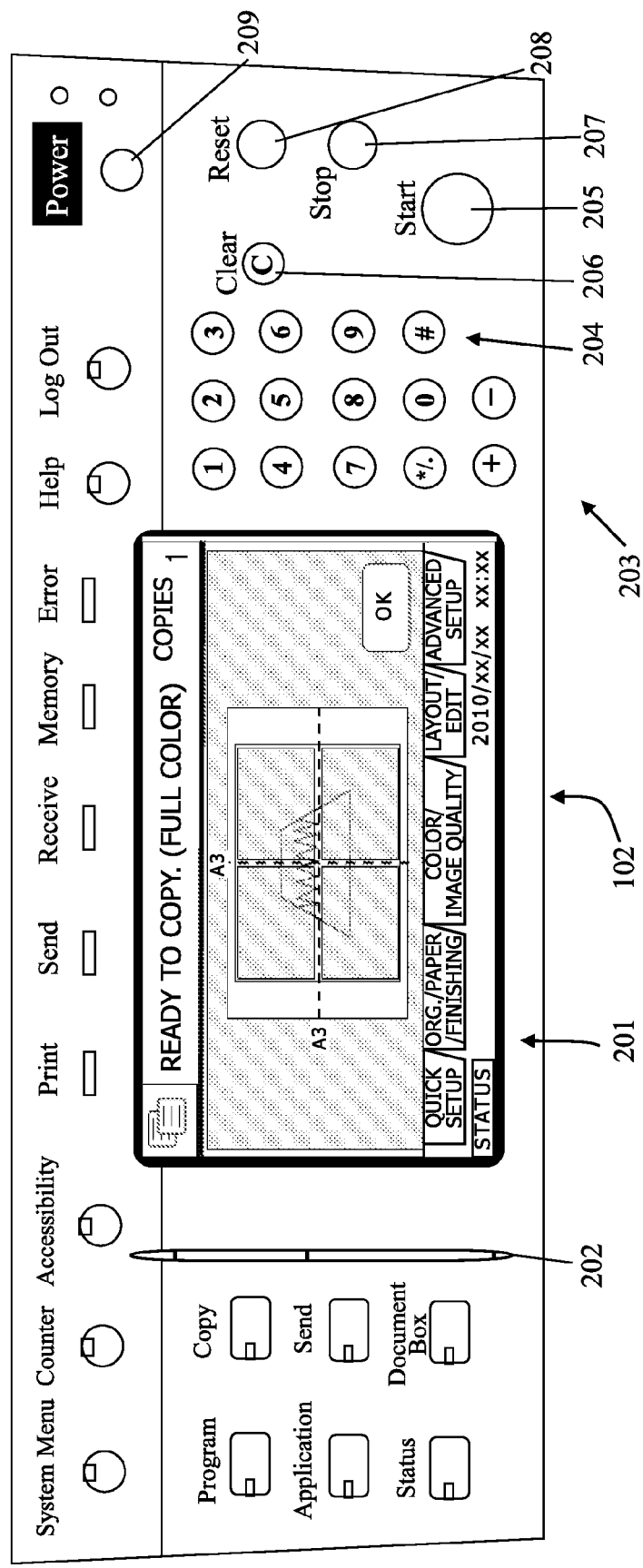
FIG. 2 shows a diagram which indicates a whole configuration of an operation unit according to the embodiment of the present disclosure.

FIG. 2 shows a diagram which indicates a whole configuration of an operation unit according to the embodiment of the present disclosure. A user uses an operation unit 102 to input a setting condition such as the aforementioned setting condition for image forming and to confirm the inputted setting condition. The operation unit 102 includes a touch panel 201 (an operation panel), a touch pen 202, and an operation key 203 which are used for a user to input a setting condition.

The touch panel 201 is one of an analog resistive type, and has a configuration in which a transparent upper film and a lower glass substrate are piled via a spacer, and transparent electrode layers made of ITO (indium Tin Oxide) or the like are formed on opposite surfaces of the upper film and the lower glass substrate. Further, it is configured so as to contact the transparent electrode layer of the upper film side to the transparent electrode layer of the lower glass substrate side at a pressed-down position when a user presses down the upper film. Under a condition that voltage is applied to the upper film and the lower glass substrate, detecting a voltage value at the pressed-down position from the upper film and the lower glass substrate identifies a coordinate value of the pressed-down position on the basis of the voltage value. If the identified pressed-down position is within a display area of a setting item key or the like in a screen displayed on the touch panel, then a setting value of the setting item key is inputted (is set).

Further, a display unit such as an LCD (Liquid Crystal Display) is arranged beneath the lower glass substrate, and when the display unit displays a screen such as an initial screen or a copy function screen, the screen is displayed on the touch panel 201. Therefore, the touch panel 201 has a function to input a setting condition and so forth, and a function to display the setting condition and so forth.

Further, the touch pen 202 is arranged near the touch panel 201. When a user contacts a tip of the touch pen 202 to the touch panel 201, a coordinate value of the contact position (i.e. the pressed-down position) is outputted. Therefore, the user presses down and selects a displayed setting item key or the like using the touch pen 202.

Further, the operation keys 203 are arranged near the touch panel 201, such as numeric keys 204, a start key 205, a clear key 206, a stop key 207, a reset key 208, and a power key 209.

Figure 3:
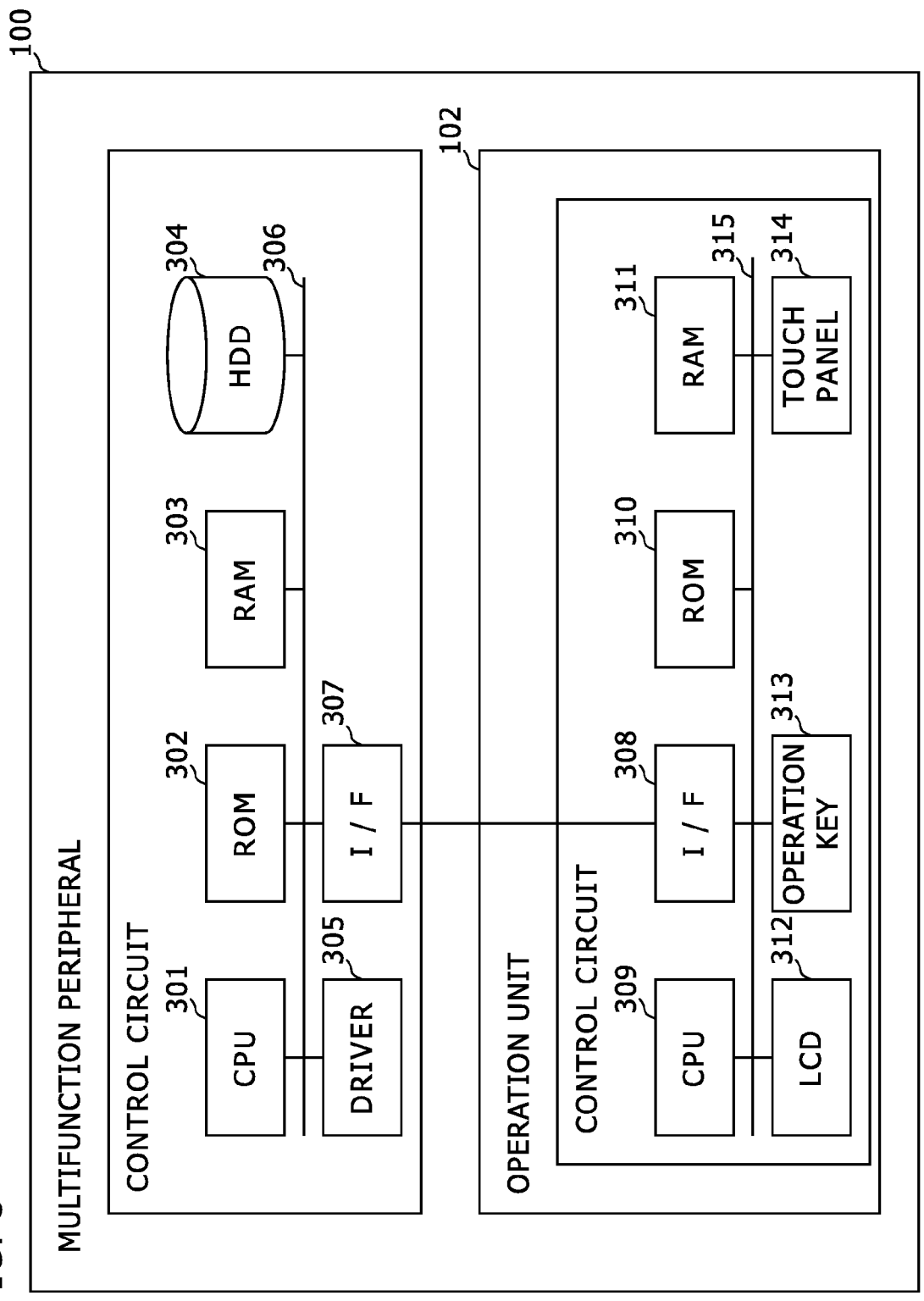
FIG. 3 shows a schematic diagram which indicates a hardware configuration of a control system in the multifunction peripheral and the operation unit according to the embodiment of the present disclosure.

In the next part, a configuration of a control system in the multifunction peripheral 100 and the operation unit 102 is explained. FIG. 3 shows a schematic diagram which indicates a hardware configuration of a control system in the multifunction peripheral 100 and the operation unit 102 according to the embodiment of the present disclosure.

In a control circuit of the multifunction peripheral 100, a CPU (Central Processing Unit) 301, a ROM (Read Only Memory) 302, a RAM (Random Access Memory) 303, an HDD (Hard Disk Drive) 304, and drivers 305 corresponding to respective driving units are connected via an internal bus 306. The CPU 301 uses the RAM 303, for example, as a work area, executes a program stored in the ROM 302, the HDD 304, or the like, transmits/receives data and instruction to/from the drivers 305 and the operation unit 102 on the basis of the execution, and controls actions of the driving units shown in FIG. 1. Further, other units mentioned below (shown in FIG. 4) than the driving units are also formed by execution of the program in the CPU 301.

Furthermore, an internal interface 307 is also connected to the internal bus 306 of the control circuit, and this internal interface 307 connects a control circuits and so forth in the operation unit 102 and the control circuit of the multifunction peripheral 100 to each other. Through the internal interface 307, the CPU 301 receives an instruction signal from the control circuit of the operation unit 102 and so forth, and transmits an instruction signal, data, and so forth to the control circuit of the operation unit 102 and so forth.

Furthermore, the control circuit of the operation unit 102 includes a CPU 309, a ROM 310, a RAM 311, an LCD 312, an operation key 313 (203), a touch panel 314 (201), and an internal interface 308 connected to an internal bus 315. When a user operates the operation key 313 or the touch panel 314, the CPU 309 transmits an instruction signal based on the operation to the control circuit of the multifunction peripheral 100 via the internal interface 308. Further, the CPU 309, the ROM 310, and the RAM 311 have the same function as the aforementioned ones, and units mentioned below (shown in FIG. 4) are also formed by the execution of the program in the CPU 309. In the ROM 310, a program and data to form the units mentioned below have been stored.

Embodiment

Figure 4:
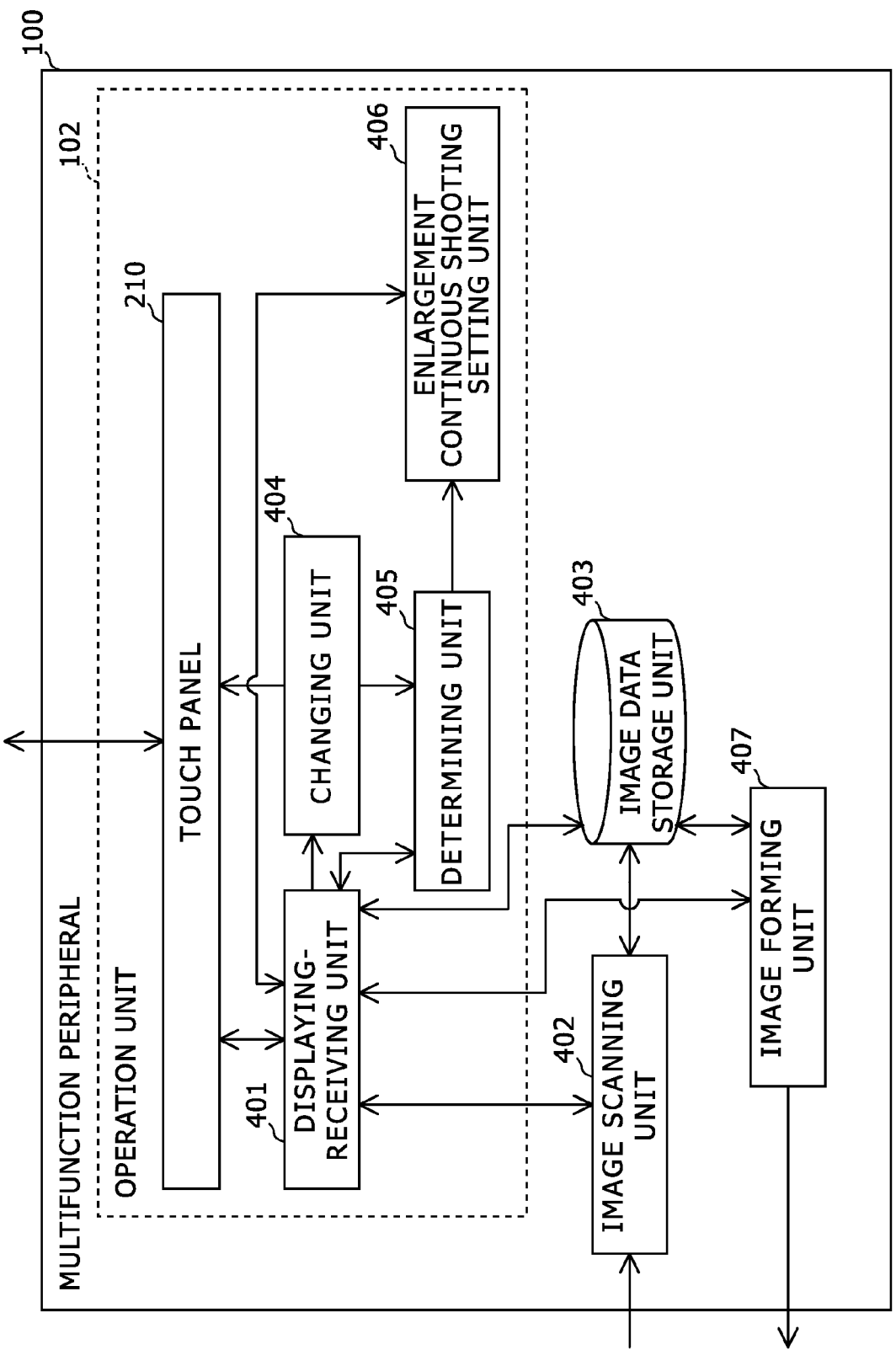
FIG. 4 shows a functional block diagram of the multifunction peripheral and the operation unit according to the embodiment of the present disclosure.
Figure 5:
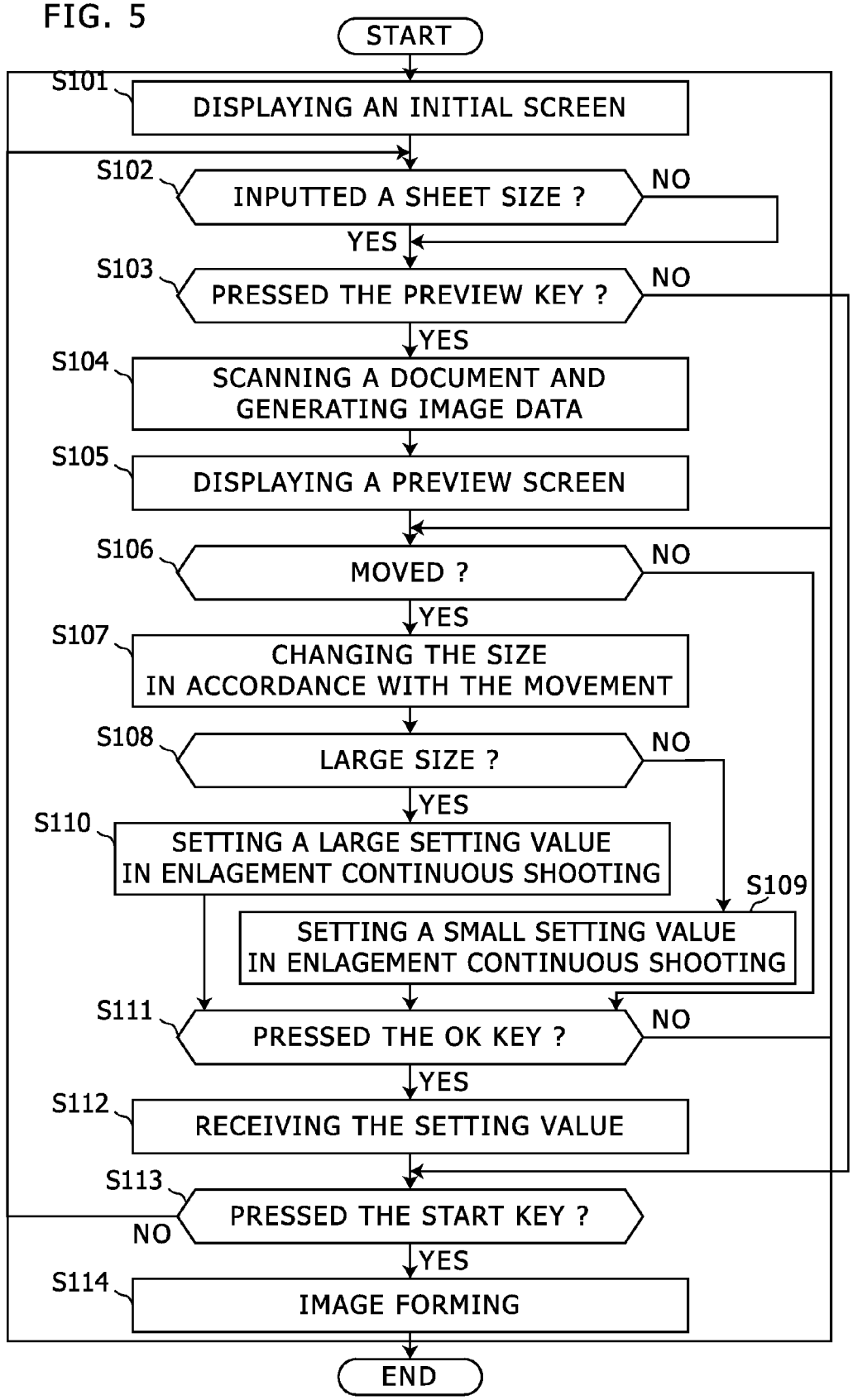
FIG. 5 shows a flowchart which indicates execution procedures in the embodiment of the present disclosure.

Referring to FIGS. 4 and 5, a configuration and execution procedures of the embodiment of the present disclosure are explained. FIG. 4 shows a functional block diagram of the multifunction peripheral and the operation unit according to the embodiment of the present disclosure. FIG. 5 shows a flowchart which indicates execution procedures in the embodiment of the present disclosure.

First of all, when a user powers on the multifunction peripheral 100, the operation unit 102 is started up together with the multifunction peripheral 100, and a displaying-receiving unit 401 of the operation unit 102 obtains initial values of setting items in a setting condition of the copy function which has been stored in a predetermined memory in advance (e.g. "A4" for "paper sheet size", vertical magnification "100%" and horizontal magnification "100%" for "zoom", "off" for "enlargement continuous shooting", and so forth), and sets them as an initial setting condition. Subsequently, the displaying-receiving unit 401 displays a preset initial screen (e.g. a copy function screen) based on the initial setting condition on the touch panel 201 (Step S101 in FIG. 5). It should be noted that a setting value of a predetermined setting item such as "document size" or "document orientation" among the setting items is identified when image data of a document is obtained.

Figure 6A:
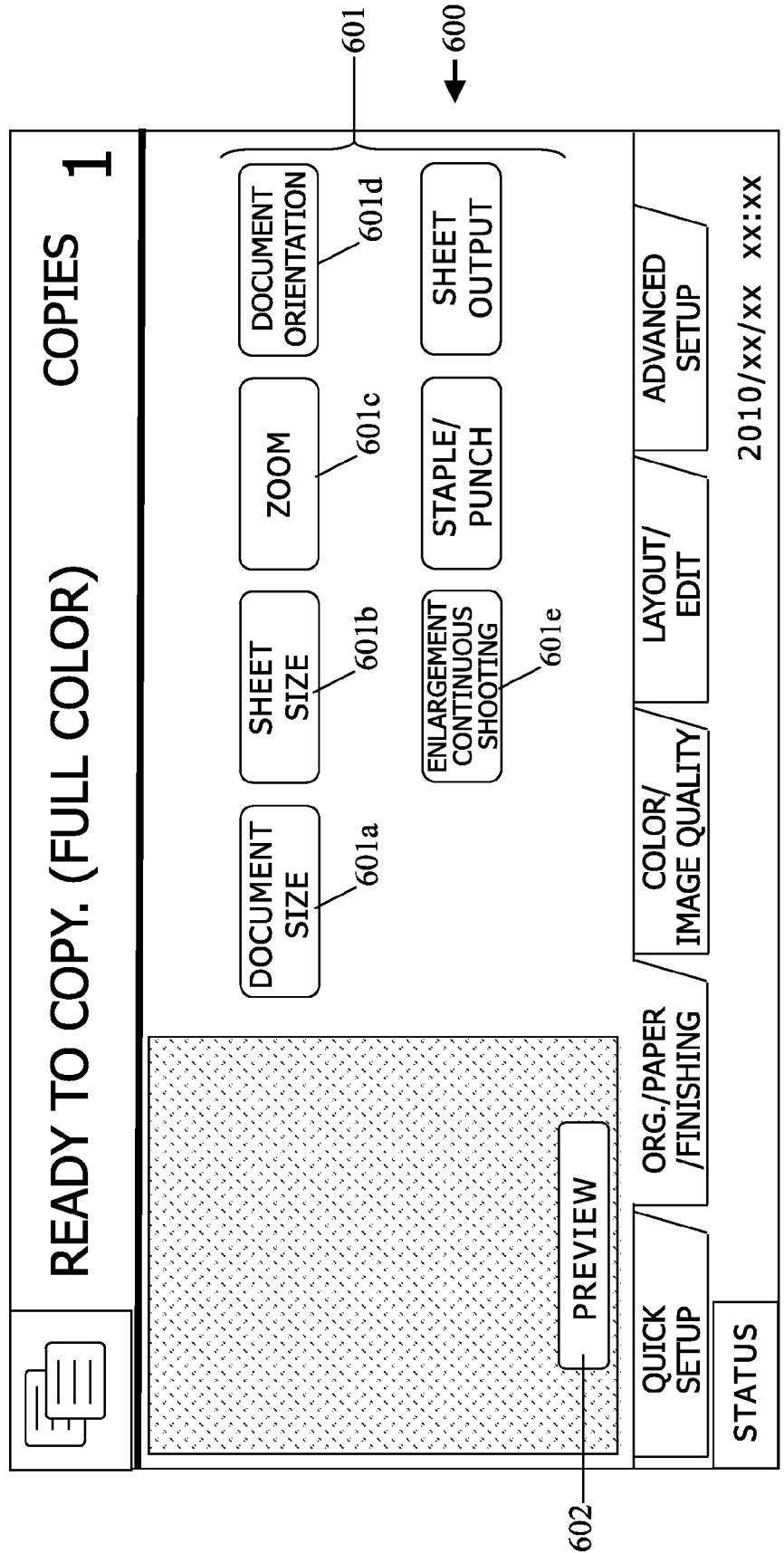
FIG. 6A shows an example of an initial screen displayed on a touch panel in the embodiment of the present disclosure.

In an initial screen 600, as shown in FIG. 6A, displayed are setting item keys 601 (e.g. a "document size" key 601a, a "sheet size" key 601b, a "zoom" key 601c, a "document orientation" key 601d, an "enlargement continuous shooting" key 601e, and so forth) to input a setting condition of the copy function, a "preview" key 602 to read image data of a document put on the platen glass 101a and display a document image as a preview image.

Here, for example, if the user presses down the "sheet size" key 601b among the setting item keys 601, then the displaying-receiving unit 401 receives this pressing-down operation to the "sheet size" key 601b, switches the initial screen 600 to a sheet size screen which enables to input a sheet size, and displays it.

Figure 6B:
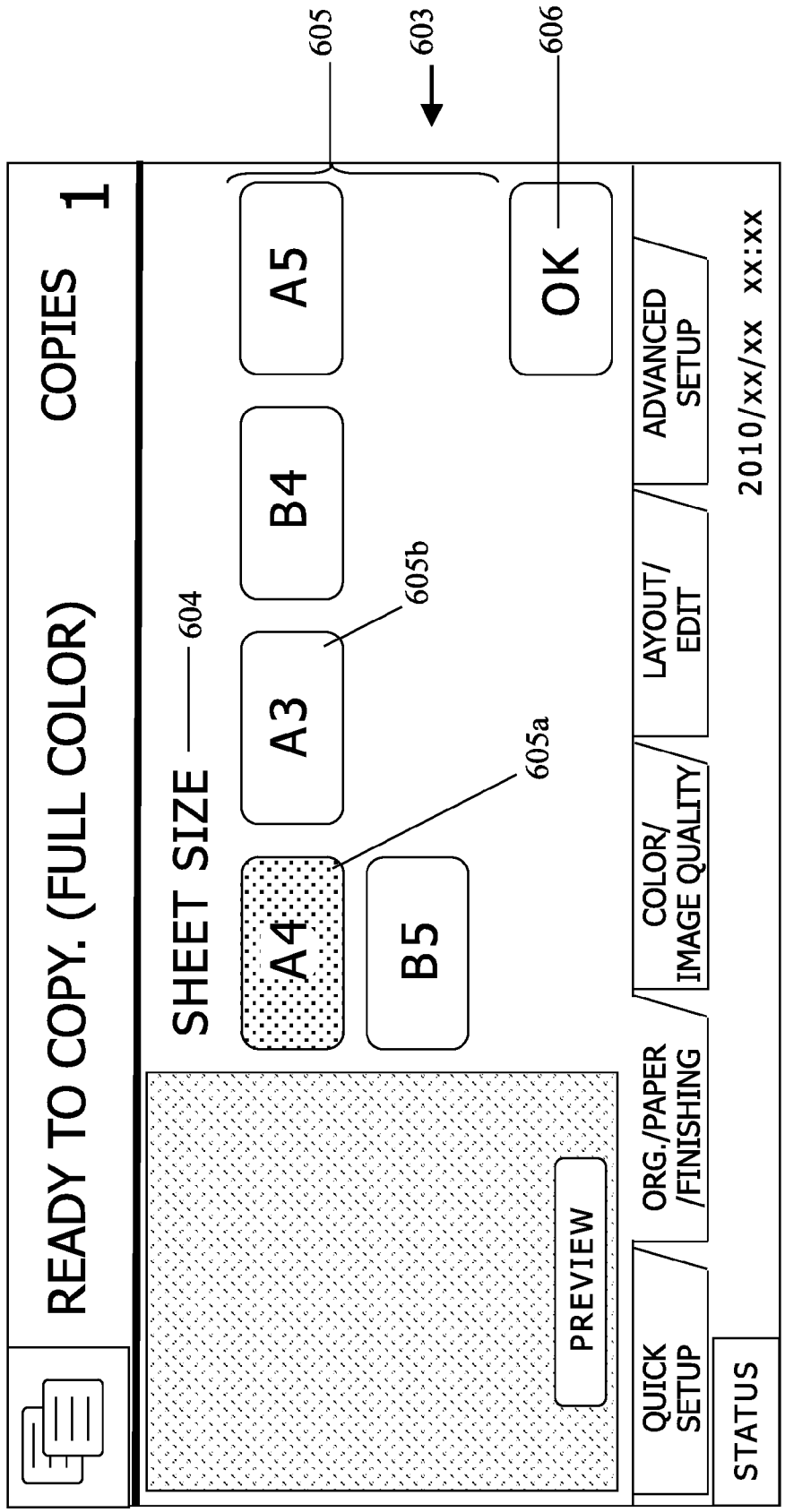
FIG. 6B shows an example of a paper sheet size screen displayed on a touch panel in the embodiment of the present disclosure.

In the sheet size screen 603, as shown in FIG. 6B, displayed are a text "sheet size" 604 indicating the setting item, setting value keys 605 (e.g. an "A4" key 605a, an "A3" key 605b, and so forth) corresponding to setting values of the setting item "sheet size", and an OK key 606.

Among the setting value keys 605, a background color of a setting value key corresponding to a currently selected setting value (e.g. the "A4" key 605a corresponding to the initial value) is set as a different color from a background color of the other setting value keys 605.

While the user is looking at the sheet size screen 603, if the user presses down a desired setting value key 605 (e.g. the "A3" key 605b), and presses down the OK key 606, then the displaying-receiving unit 401 receives these pressing-down operations on the "A3" key 605b and the OK key 606, changes a setting value of the "sheet size" (the initial value "A4" here as mentioned) to "A3" corresponding to the "A3" key 605b (YES at Step S102 in FIG. 5), switches the sheet size screen 603 to the initial screen 600, and displays it. A setting value of "sheet size" may still be the initial value "A4" (NO at Step S102 in FIG. 5).

Subsequently, if the user puts a document P on the platen glass 101a in an orientation (e.g. landscape), and presses down the "preview" key 602 in the initial screen 600 (YES at Step S103 in FIG. 5), then the displaying-receiving unit 401 receives the pressing-down operation to the "preview" key 602, and informs it to the image scanning unit 402. Upon receiving it, the image scanning unit 402 reads image data from a document put on the platen glass 101 (Step S104 in FIG. 5), and stores the image data of the document in an image data storage unit 403.

After storing the image data of the document in the image data storage unit 403, the image scanning unit 402 informs it to the displaying-receiving unit 401. Upon receiving it, the displaying-receiving unit 401 obtains a document size (e.g. "A4") and a document orientation (e.g. "landscape") from a vertical size and horizontal size of the image data of the document (e.g. the vertical size "210 mm" and the horizontal size "297 mm"), and sets them as setting values to the setting items.

For example, to obtain the document size and the document orientation, the displaying-receiving unit 401 uses a memory in which a relationship has been stored between a range of vertical and horizontal sizes and a document size and a document orientation corresponding to the vertical and horizontal sizes, compares the vertical and horizontal sizes of the image data of the document with the range of the vertical and horizontal sizes in the memory, and obtains a document size and a document orientation of the image data on the basis of the comparison.

Subsequently, the displaying-receiving unit 401 generates a document preview image which can be displayed within a display area in a preview screen mentioned below on the basis of the image data of the document, the document size ("A4"), the document orientation ("landscape"), and the size of the display area of the preview screen.

Here, the size of the display area depends on the display area of the touch panel 201, and therefore, for example, the vertical size of the document preview image is set as a size "21.0 mm" obtained by converting the vertical size "210 mm" of "A4" in the landscape orientation on the basis of the size of the display area, and the horizontal size of the document preview image is set as a size "29.7 mm" obtained by converting the horizontal size "297 mm" of "A4" in the landscape orientation on the basis of the size of the display area.

Further, the displaying-receiving unit 401 generates a paper sheet preview image which can be displayed within the display area in the preview screen on the basis of the sheet size ("A3"), image data of a sheet which has been stored in advance in a predetermined memory, and the size of the display area of the preview screen.

Here, the size of the display area depends on the display area of the touch panel 201, and therefore, for example, the vertical size of the sheet preview image is set as a size "29.7 mm" obtained by converting the vertical size "297 mm" of "A3" in the landscape orientation on the basis of the size of the display area, and the horizontal size of the sheet preview image is set as a size "42.0 mm" obtained by converting the horizontal size "420 mm" of "A3" in the landscape orientation on the basis of the size of the display area.

Further, switching from the initial screen 600, on the touch panel 201, the displaying-receiving unit 401 displays a preview screen in which the document preview image puts on the paper sheet preview image (Step S105 in FIG. 5).

Figure 7A:
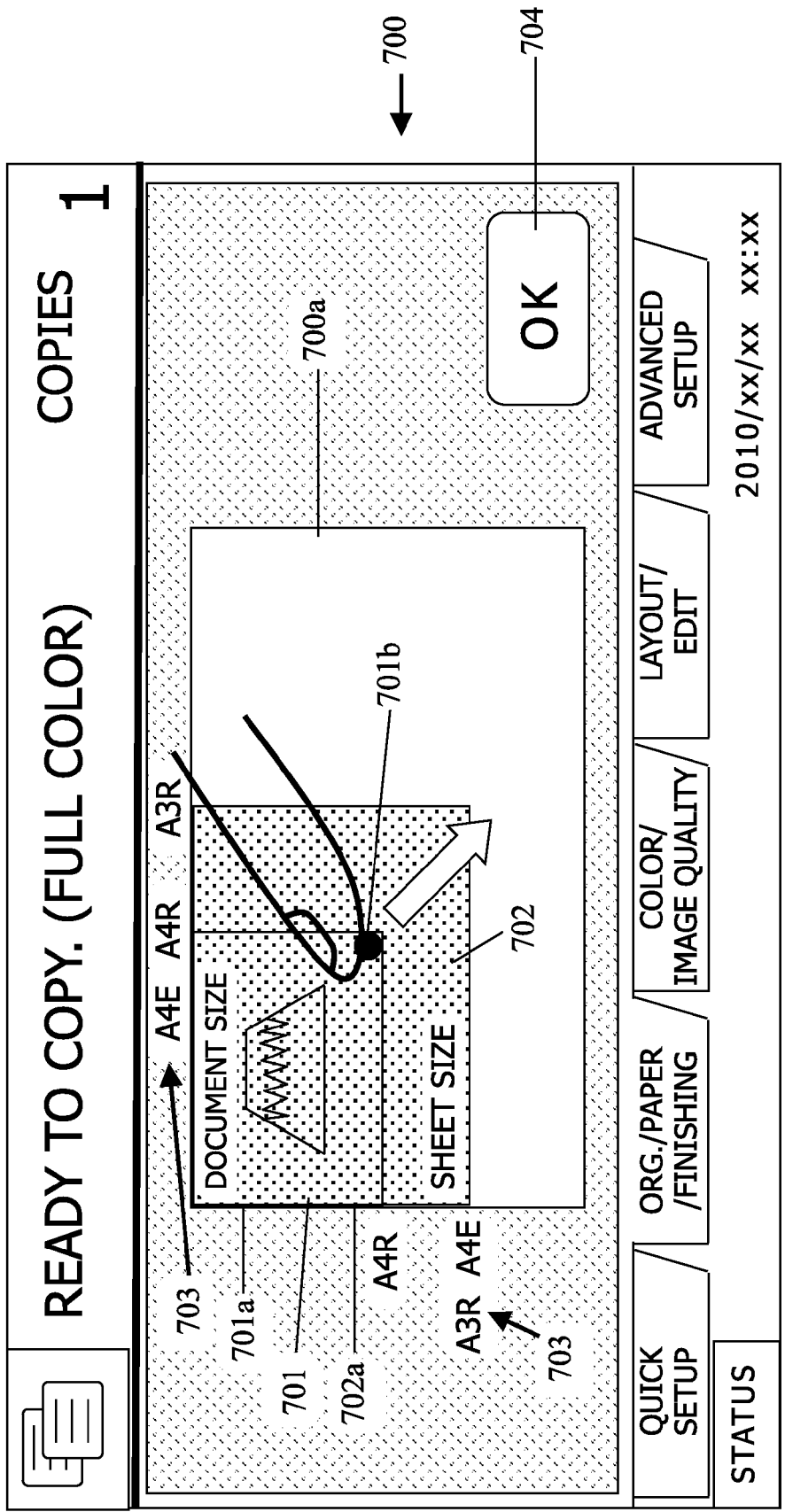
FIG. 7A shows an example of a preview screen displayed on a touch panel in the embodiment of the present disclosure.

In a preview screen 700, as shown in FIG. 7A, in a predetermined display area 700a, a document preview image 701 and a paper sheet preview image 702 are displayed so as to adjust an edge of the document preview image 701 (a left edge 701a) to an edge of the paper sheet preview image 702 corresponding to it (a left edge 702a) and put the document preview image 701 on the paper sheet preview image 702.

Therefore, a user can visually confirm a relation between the document preview image 701 and the sheet preview image 702, and can intuitively understand a relation between a current document size ("A4") and a current paper sheet size ("A3").

The document preview image 701 and the paper sheet preview image 702 are displayed with respective different colors such as blue and yellow. Further, the document preview image 701 is semi-transparently displayed over the sheet preview image 702. This manner makes the aforementioned visual confirmation easier.

Further, in the preview screen 700, size indicators 703 and an OK key 704 are also displayed. The size indicators 703 (e.g. "A4E" which indicates the A4 size in the portrait orientation, "A4R" which indicates the A4 size in the landscape orientation, "A3R" which indicates the A3 size in the landscape orientation, and so forth) are respectively displayed for the document preview image 701 and the paper sheet preview image 702, and indicates respective sizes of the document preview image 701 and the paper sheet preview image 702.

Further, the displaying-receiving unit 401 performs the display so as to enable a user to move a part of the document preview image 701 while the user is touching it (i.e. so as to enable a user to drag a part of the document preview image 701) in a vertical direction (i.e. upward or downward direction), a horizontal direction (i.e. leftward or rightward direction), or an oblique direction as a combination of a vertical direction and a horizontal direction.

While a user is looking at the preview screen 700, as shown in FIG. 7A, if the user touches a part of the document preview image 701 (e.g. a bottom-right corner part 701b) with his/her finger and moves his/her finger in a lower right direction (in an oblique direction), then the displaying-receiving unit 401 detects it (YES at Step S106 in FIG. 5), and informs it to the changing unit 404. Upon receiving it, the changing unit 404 changes a vertical size and a horizontal size of the document preview image 701 in accordance with its movement amount and its movement direction (an oblique direction) (Step S107 in FIG. 5).

Specifically, if a user moves the part 701b of the document preview image 701 in a lower right direction, since this direction is a direction to increase the horizontal size and the vertical size of the document preview image 701, the changing unit 404 changes a vertical size of the document preview image 701 to a size obtained by adding the original vertical size (here, 21.0 mm) of the document preview image 701 and a length (e.g. 2.0 mm) corresponding to the movement amount in the vertical direction (the downward direction), and also changes a horizontal size the document preview image 701 to a size obtained by adding the original horizontal size (here, 29.7 mm) of the document preview image 701 and a length (e.g. 2.0 mm) corresponding to the movement amount in the horizontal direction (the rightward direction). In this manner, the changing unit 404 independently changes respective vertical and horizontal sizes of the document preview image 701.

In the aforementioned manner, instead of the sizes, the magnifications of the document preview image 701 may be changed. It should be noted that the original vertical and horizontal sizes of the document preview image 701 are not changed until the OK key 704 is pressed down.

Upon changing the vertical size and the horizontal size of the document preview image 701, the changing unit 404 informs it to the determining unit 405. Upon receiving it, the determining unit 405 determines whether or not the changed vertical size and the changed horizontal size of the document preview image 701 are larger than a vertical size and a horizontal size of a largest sheet preview image among settable ones (Step S108 in FIG. 5).

Specifically, the determining unit 405 firstly obtains the changed vertical size and the changed horizontal size of the document preview image 701 (here, 23.0 mm as the vertical size and 31.7 mm as the horizontal size) and obtains the vertical size and the horizontal size of the largest paper sheet preview image (e.g. 29.7 mm as the vertical size and 42.0 mm as the horizontal size in case of "A3" in the landscape orientation).

Specifically, to obtain the vertical size and the horizontal size of the largest paper sheet preview sheet, for example, the determining unit 405 obtains a setting value (e.g. "A3") of a settable largest paper sheet size among setting values of the setting item "sheet size", and calculates the vertical size and the horizontal size of the largest paper sheet preview image corresponding to the display area in the preview screen on the basis of this setting value, the aforementioned sheet image data, and the size of the display area in the preview screen. The determining unit 405 uses the calculated vertical and horizontal sizes as vertical and horizontal sizes of the largest paper sheet preview image. It should be noted that if a user has selected the largest paper sheet size "A3" as a setting value of the setting item "sheet size", the determining unit 405 uses vertical and horizontal sizes of the already displayed sheet preview image 702 as vertical and horizontal sizes of the largest paper sheet preview image.

Subsequently, the determining unit 405 compares the vertical size and the horizontal size of the document preview image 701 with the vertical size and the horizontal size of the largest paper sheet preview image respectively, and determines whether or not the vertical size of the document preview image 701 is larger than the vertical size of the largest paper sheet preview image and whether or not the horizontal size of the document preview image 701 is larger than the horizontal size of the largest paper sheet preview image.

According to the result of the determination, if the vertical size of the document preview image 701 is smaller than the vertical size of the largest paper sheet preview image and the horizontal size of the document preview image 701 is either equal to or smaller than the horizontal size of the largest paper sheet preview image (NO at Step S108 in FIG. 5) (i.e. if the size is small), then the determining unit 405 informs it to the enlargement continuous shooting setting unit 406. Upon receiving it, the enlargement continuous shooting setting unit 406 changes a current setting value (e.g. "off") of the setting item "enlargement continuous shooting" of the displaying-receiving unit 401 to a setting value which is smaller than the current setting value among setting values (e.g. "A1", "A0", and "off") of the setting item "enlargement continuous shooting" (Step S109 in FIG. 5). Here, if the current setting value is the smallest setting value "off", then the setting value keeps "off" after this changing process.

If a setting value of "enlargement continuous shooting" is set as the setting value "off", then the document preview image 701 itself in the preview screen 700 is displayed after changing its vertical and horizontal sizes. It should be noted that if the current setting value of "enlargement continuous shooting" is "off", this changing process may not be performed.

Otherwise, after the user continues to move the part 701b of the document preview image 701 in a lower right direction, according to the result of the aforementioned determination, as shown in FIG. 7A, if the vertical size of the document preview image 701 is larger than the vertical size (29.7 mm) of the largest paper sheet preview image 702 and/or the horizontal size of the document preview image 701 is larger than the horizontal size (42.0 mm) of the largest paper sheet preview image 702 (YES at Step S108 in FIG. 5), then the determining unit 405 informs it to the enlargement continuous shooting setting unit 406. Upon receiving it, the enlargement continuous shooting setting unit 406 sets an enlargement continuous shooting mode. The enlargement continuous shooting mode divides a document image based on the document image data corresponding to the document preview image 701 into plural divisional images, enlarges the respective divisional images, and forms the enlarged divisional images on respective largest paper sheets.

Specifically, the enlargement continuous shooting setting unit 406 changes a current setting value ("off") of the setting item "enlargement continuous shooting" of the displaying-receiving unit 401 to a setting value (e.g. "A1") which is larger than the current setting value ("off") (Step S110 in FIG. 5). The enlargement continuous shooting setting unit 406 also changes a setting value of the paper sheet size to the largest paper sheet size "A3", but in the aforementioned case, since the setting value of the paper sheet size has already been set as "A3", it is unnecessary to change it. Therefore, the enlargement continuous shooting setting unit 406 automatically sets the enlargement continuous shooting mode.

Figure 7B:
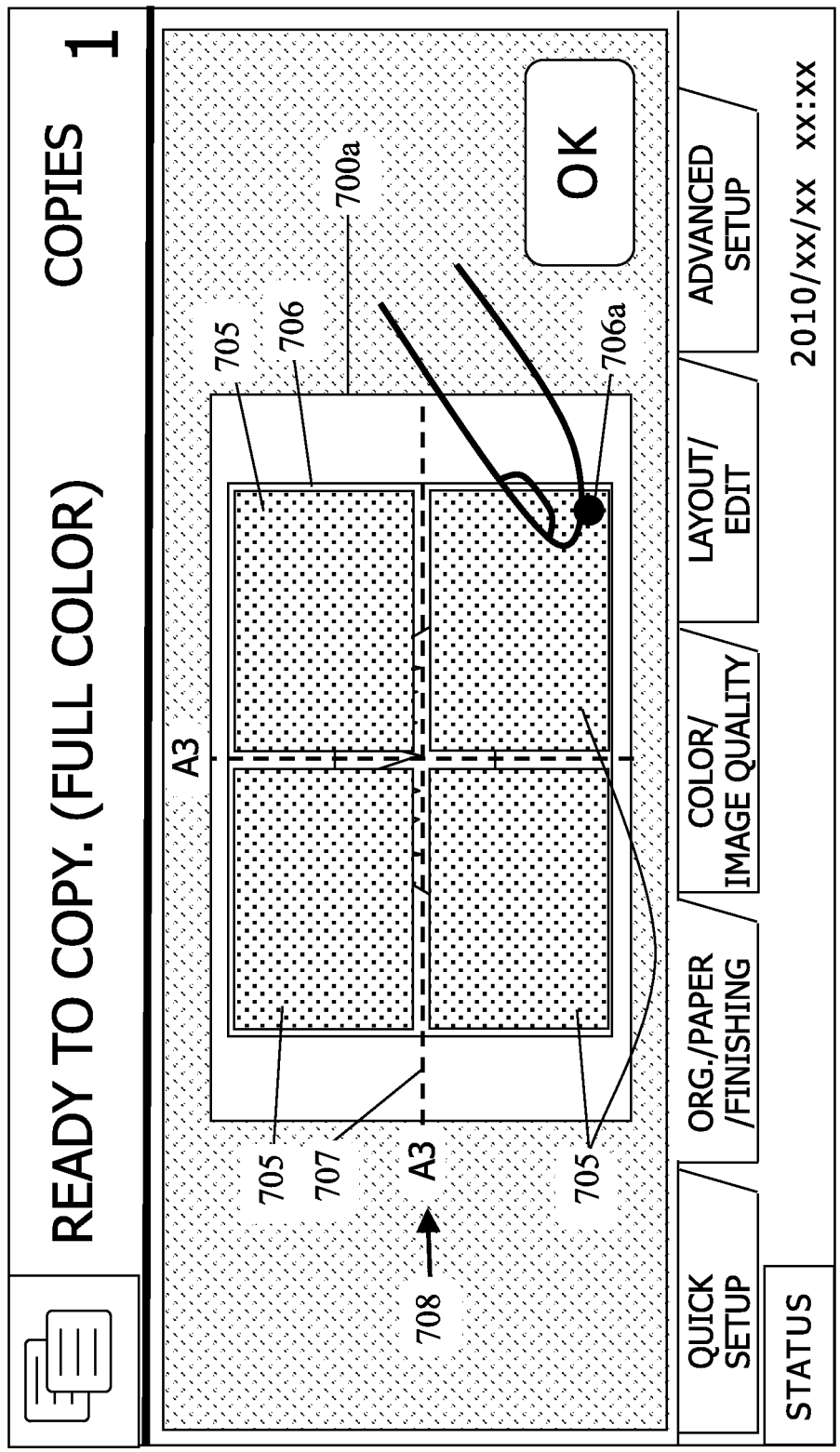
FIG. 7B shows an example of a preview screen displayed on a touch panel in the embodiment of the present disclosure.

Upon setting it, as shown in FIG. 7B, for the setting value "A1" of "enlargement continuous shooting", the displaying-receiving unit 401 enlarges the vertical size and the horizontal size of the document preview image 701 to a vertical size and a horizontal size of four largest paper sheet preview images 705 which are arranged in two rows and two columns, and displays a document preview image 706 for enlargement continuous shooting which is the enlarged document preview image 701. Subsequently, the displaying-receiving unit 401 puts the document preview image 706 for enlargement continuous shooting on the four largest paper sheet preview images 705 and displays them.

As mentioned, when a user makes the vertical size and the horizontal size of the document preview image 701 larger than the largest paper sheet preview image 702, the enlargement continuous shooting (poster printing) based on the largest paper sheet size is automatically set, and therefore, a user's key operation is not required for it. Further, since the document preview image 706 for enlargement continuous shooting is displayed, a user can easily imagine a finish image. Furthermore, although a user hardly uses enlargement continuous shooting in general, this manner prompts a user to use it.

It should be noted that due to a limited display area of the touch panel 201, the vertical size and the horizontal size of the document preview image 706 for enlargement continuous shooting and the vertical size and the horizontal size of the four largest paper sheet preview images 705 are adequately adjusted so as to fit them to the size of the display area 700a of the preview screen 700.

Furthermore, with the document preview image 706 for enlargement continuous shooting, border lines 707 of the aforementioned four largest paper sheet preview images 705 and a paper sheet size "A3" 708 are also displayed.

If after the enlargement continuous shooting setting unit 406 changes the setting value of enlargement continuous shooting from "off" to "A1", without pressing down the OK key 704 (NO at Step S111 in FIG. 5), as shown in FIG. 7B, a user continues to move a part (e.g. a bottom-right corner part 706a) of the document preview image 706 for enlargement continuous shooting to the same direction as mentioned (i.e. to a lower right direction), then the following process is performed.

If a user moves the part 706a of the document preview image 706 for enlargement continuous shooting shown in FIG. 7B in a lower right direction, then the displaying-receiving unit 401 detects it (YES as Step S106 in FIG. 5), and the changing unit 404 changes the vertical size and the horizontal size of the document preview image 706 for enlargement continuous shooting in accordance with the aforementioned movement amount and the aforementioned movement direction (the lower right direction) (Step S107 in FIG. 5). Subsequently, if the enlargement continuous shooting mode has been set, then the determining unit 405 determines whether or not the vertical size and the horizontal size of the document preview image 706 for enlargement continuous shooting corresponding to the setting of enlargement continuous shooting are larger than the vertical size and the horizontal size of the corresponding plural largest paper sheet preview image 705 (Step S108 in FIG. 5).

According to the result of the determination, if the vertical size and the horizontal size of the document preview image 706 for enlargement continuous shooting are larger than the vertical size and the horizontal size of the corresponding plural largest paper sheet preview image 705 (YES at Step S108 in FIG. 5), then the determining unit 405 informs it to the enlargement continuous shooting setting unit 406, and upon receiving it, the enlargement continuous shooting setting unit 406 changes the current setting value ("A1") of enlargement continuous shooting to a setting value (e.g. "A0") larger than the current setting value ("A1") (Step S110 in FIG. 5). Therefore, the enlargement continuous shooting setting unit 406 automatically changes a current setting value of enlargement continuous shooting to a setting value which is next to and larger than the current setting value.

Figure 8A:
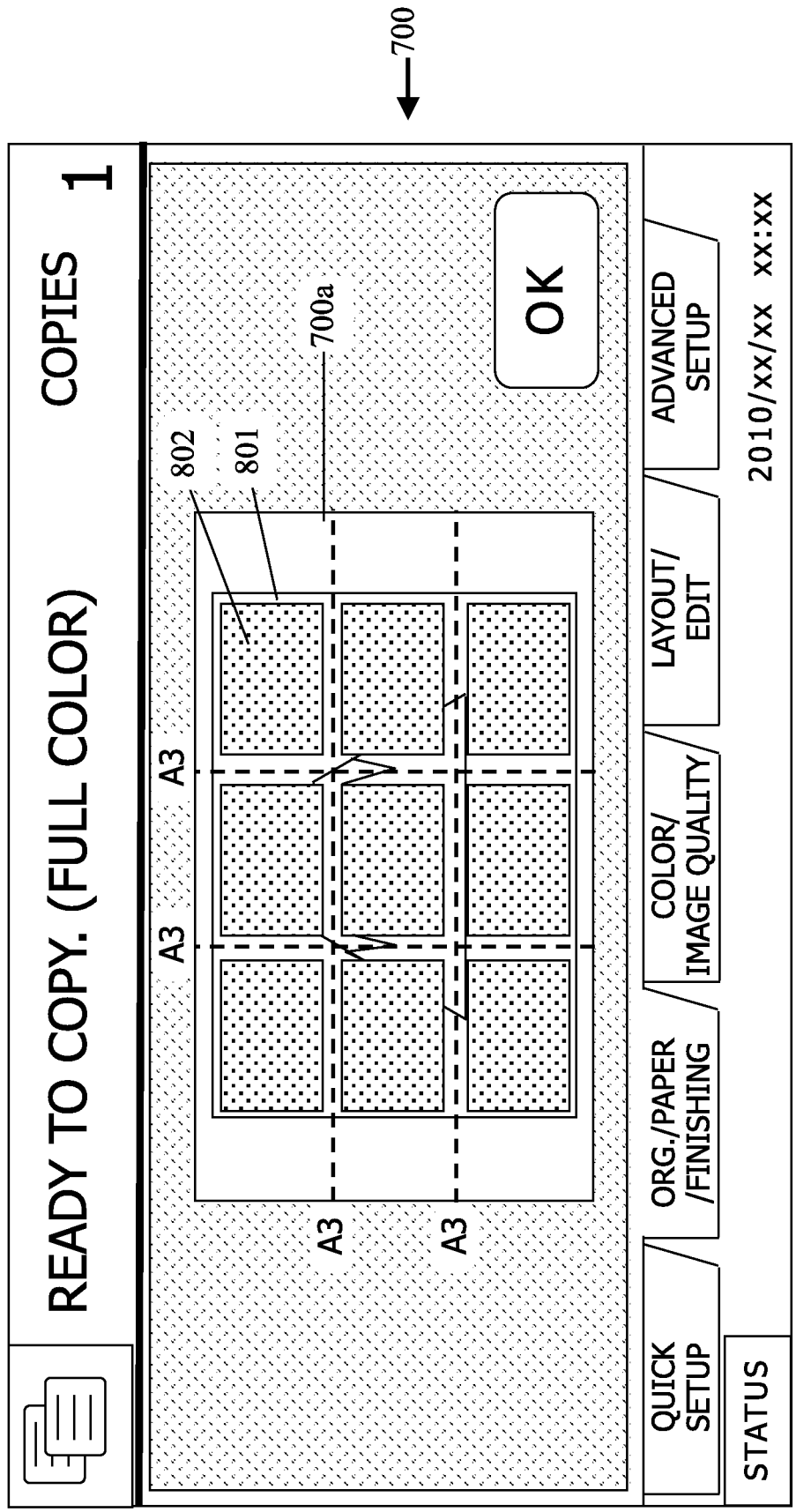
FIG. 8A shows an example of a preview screen displayed on a touch panel in the embodiment of the present disclosure.

Subsequently, as shown in FIG. 8A, for the setting value "A0" of "enlargement continuous shooting", the displaying-receiving unit 401 enlarges the vertical size and the horizontal size of the document preview image 706 for enlargement continuous shooting to a vertical size and a horizontal size of nine largest paper sheet preview images 802 which are arranged in three rows and three columns, and displays a next document preview image 801 for enlargement continuous shooting as the enlarged document preview image 706. The displaying-receiving unit 401 puts the document preview image 801 for enlargement continuous shooting on the nine largest paper sheet preview images 802 and displays them.

It should be noted that the vertical size and the horizontal size of the document preview image 801 for enlargement continuous shooting and the vertical size and the horizontal size of the nine largest paper sheet preview images 802 are adequately adjusted again so as to fit them to the size of the display area 700a of the preview screen 700, as shown in FIG. 8A.

Therefore, if a user performs a drag operation so as to enlarge the vertical size and the horizontal size of the document preview image 706 for enlargement continuous shooting, then the setting value of enlargement continuous shooting is automatically changed to a larger one, and therefore, a user's key operation is not required for it and a user can adjust a setting value of enlargement continuous shooting while the user visually confirms the images.

On the other hand, if after the enlargement continuous shooting setting unit 406 changes the setting value of enlargement continuous shooting from "off" to "A1", as shown in FIG. 7B, a user continues to move a part (e.g. a bottom-right corner part 706a) of the document preview image 706 for enlargement continuous shooting to an opposite direction (i.e. to an upper left direction) of the aforementioned direction, then the following process is performed.

If a user moves the part 706a of the document preview image 706 for enlargement continuous shooting shown in FIG. 7B in an upper left direction, then the displaying-receiving unit 401 detects it (YES as Step S106 in FIG. 5), and the changing unit 404 changes the vertical size and the horizontal size of the document preview image for enlargement continuous shooting in accordance with the aforementioned movement amount and the aforementioned movement direction (the upper left direction) (Step S107 in FIG. 5). Subsequently, if the enlargement continuous shooting mode has been set as well as mentioned, then the determining unit 405 determines whether or not the vertical size and the horizontal size of the document preview image 706 for enlargement continuous shooting corresponding to the setting of enlargement continuous shooting are larger than the vertical size and the horizontal size of the corresponding plural largest paper sheet preview image 705 (Step S108 in FIG. 5).

According to the result of the determination, if the vertical size and the horizontal size of the document preview image 706 for enlargement continuous shooting are equal to or less than the vertical size and the horizontal size of the corresponding plural largest paper sheet preview image 705 (NO at Step S108 in FIG. 5) (i.e. if the size is small), then the determining unit 405 informs it to the enlargement continuous shooting setting unit 406, and upon receiving it, the enlargement continuous shooting setting unit 406 changes the current setting value ("A1") of enlargement continuous shooting to a setting value ("off") smaller than the current setting value ("A1") (Step S109 in FIG. 5). Therefore, the enlargement continuous shooting setting unit 406 automatically changes a current setting value of enlargement continuous shooting to a setting value which is next to and smaller than the current setting value. In the aforementioned case, the enlargement continuous shooting mode is automatically canceled.

Figure 8B:
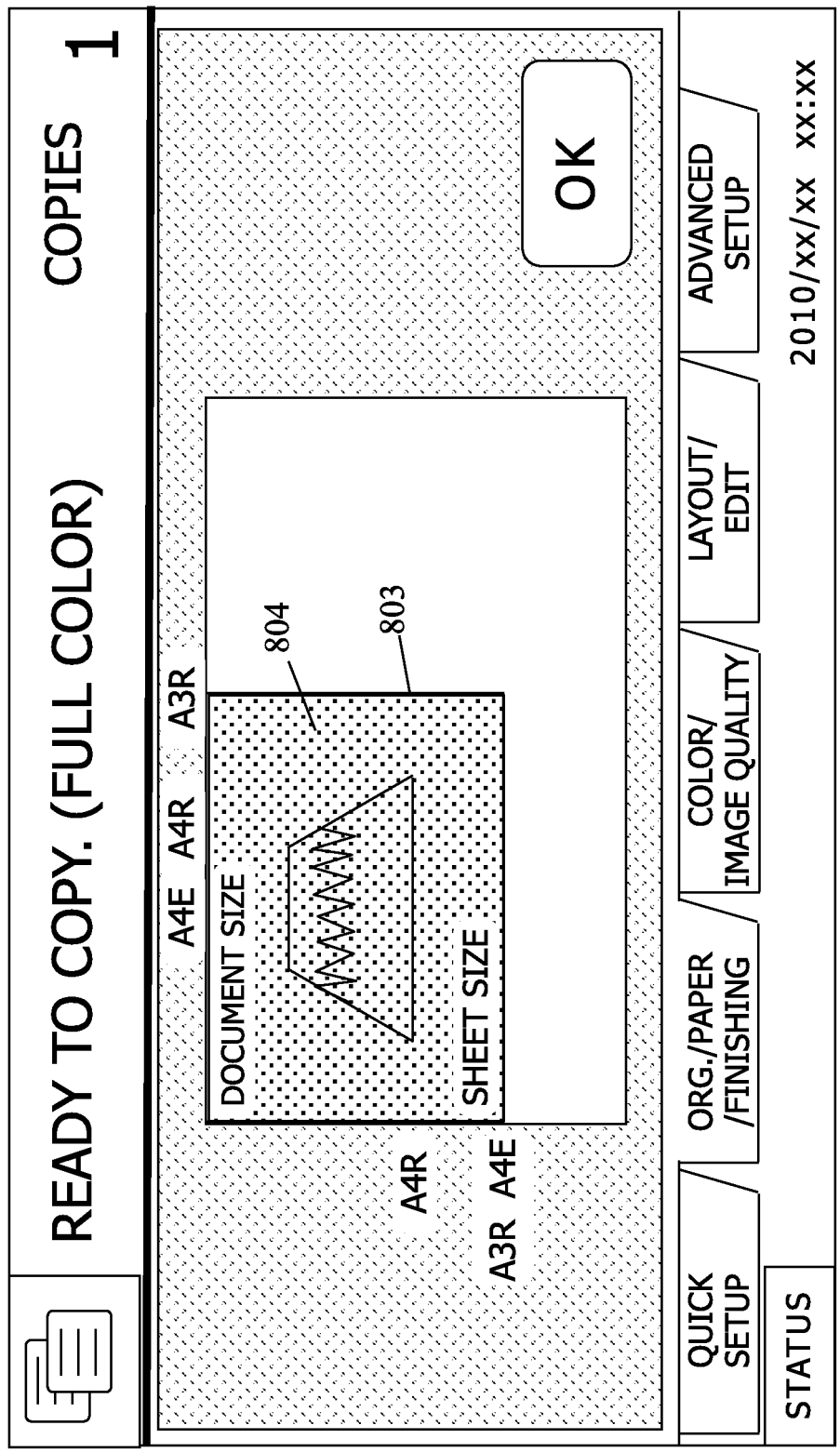
FIG. 8B shows an example of a preview screen displayed on a touch panel in the embodiment of the present disclosure.

In this case, as shown in FIG. 8B, for the setting value "off" of "enlargement continuous shooting", the displaying-receiving unit 401 changes the vertical size and the horizontal size of the document preview image 706 for enlargement continuous shooting back to the vertical size and the horizontal size of the normal document preview image, and fits the vertical size and the horizontal size of the document preview image to the vertical size and the horizontal size of the largest paper sheet preview image. The displaying-receiving unit 401 puts the normal document preview image 803 of "A3" on the largest paper sheet preview image 804 of "A3" and displays them.

Therefore, if a user performs a drag operation so as to reduce the vertical size and the horizontal size of the document preview image 706 for enlargement continuous shooting, then the setting value of enlargement continuous shooting is automatically changed to a smaller one, and a user can adjust a setting value of enlargement continuous shooting by a user's drag operation while the user visually confirms the images.

In the aforementioned case, the enlargement continuous shooting mode is canceled, but for example, when the enlargement continuous shooting setting unit 406 changes the setting value of enlargement continuous shooting after changing the setting value of enlargement continuous shooting from "A1" to "A0", the setting value is changed from "A0" to "A1" smaller than "A0".

If a user presses down the OK key 704 while the user is looking at the preview screen 700, then the displaying-receiving unit 401 receives the pressing-down operation to the OK key 704 (YES at Step S111 in FIG. 5), and receives the vertical size and the horizontal size of the document preview image displayed in the preview screen 700, the paper sheet size, and on/off of the enlargement continuous shooting mode as setting values of setting items and a vertical size and a horizontal size of image data of a document (Step S112 in FIG. 5). It should be noted that the vertical size and the horizontal size of the document preview image is converted to the vertical size and the horizontal size of the image data of the document on the basis of the size of the display area.

Therefore, if a user performs a drag operation on the document preview image 701 in the preview screen 700 and presses down the OK key 704, then the user can easily input setting values of setting items related to the drag operation. Further, since it enables to input while confirming visually, it prevents a copy error and so forth.

Subsequently, the displaying-receiving unit 401 switches from the preview screen 700 to the initial screen 600, and displays it. When displaying the initial screen 600, the displaying-receiving unit 401 may display a document preview image based on a current setting condition on an area over the preview key 602.

If a user presses down the start key 205 while the user is looking at the initial screen 600, then the displaying-receiving unit 401 receives the pressing-down operation to the start key 205 (YES at Step S113 in FIG. 5), and informs the pressing-down operation to the start key 205 and a setting condition (i.e. setting values of setting items) which has been received to the image forming unit 407. Upon receiving them, the image forming unit 407 obtains the image data of the document by referring the image data storage unit 403, and forms an image of the document on the paper sheet on the basis of the setting condition (Step S114 in FIG. 5).

Since this setting condition includes a setting value that a user inputs by a drag operation on the document preview image 701, performing image forming produces a printed matter according to user's intention and the user can obtain the desired printed matter.

For example, if the setting value "A1" of enlargement continuous shooting is included in the setting condition, then for the setting value "A1" of enlargement continuous shooting, the image forming unit 407 enlarges a document image based on the image data of the document and forms divisional images of the enlarged document image on respective four paper sheets with the largest paper sheet size "A3".

In Step S113, if the user has not selected the start key 205 (NO at Step S113 in FIG. 5), then return to Step S102, and the displaying-receiving unit 401 may receive input of a paper sheet size (Step S102 in FIG. 5) or a pressing-down operation to the "preview" key (Step S103 in FIG. 5).

In the present embodiment, the operation unit 102 includes the changing unit 404 which changes a size of the document image data corresponding to the document preview image 701 in accordance with a movement amount and a movement direction when a user touches the part 701b of the document preview image 701 and moves the touched part; and the determining unit 405 which determines whether or not a vertical size and a horizontal size of the document preview image 701 after the change by the changing unit 404 are larger than a vertical size and a horizontal size of a largest paper sheet preview image corresponding to a settable largest paper sheet size. Further, this operation unit 102 includes the enlargement continuous shooting setting unit 406 which sets the enlargement continuous shooting mode if it is determined that the vertical size and the horizontal size of the document preview image 701 are larger than the vertical size and the horizontal size of the largest paper sheet preview image. The enlargement continuous shooting mode divides a document image based on the document image data corresponding to the document preview image 701 into plural divisional images, enlarges the respective divisional images, and forms the enlarged divisional images on respective paper sheets.

Therefore, due to a user's drag operation, the enlargement continuous shooting mode (poster printing mode) is automatically set, and therefore, a user's key operation is not required for it, and a preview image for enlargement continuous shooting enables a user to easily imagine a finish image.

Further, in the operation unit 102 of the aforementioned embodiment, in the setting of "enlargement continuous shooting", the largest paper sheet size "A3" is set as a paper sheet used for image forming, but it is not limited to this; and for example, plural types of paper sheets used for image forming (e.g. "A3", "A4", and so forth) may be displayed so as to enable a user to select one of them and so as to cause the user to select one of them.

Further, in the operation unit 102 of the aforementioned embodiment, the enlargement continuous shooting setting unit 406 sets the enlargement continuous shooting mode if the vertical size of the document preview image 701 is larger than the vertical size of the largest paper sheet preview image 702 or the horizontal size of the document preview image 701 is larger than the horizontal size of the largest paper sheet preview image 702. Therefore, for example, if a user continues to move the part 701b of the document preview image 701 either only in the downward direction or only in the rightward direction, then the enlargement continuous shooting setting unit 406 sets the enlargement continuous shooting mode.

Further, when the enlargement continuous shooting mode has been set, for example, if a user continues to move the part 706a of the document preview image 706 either only in the downward direction or only in the rightward direction, then the enlargement continuous shooting setting unit 406 increases the setting value of the enlargement continuous shooting mode by one step. On the other hand, when the enlargement continuous shooting mode has been set, for example, if a user continues to move the part 706a of the document preview image 706 either only in the upward direction or only in the leftward direction, then the enlargement continuous shooting setting unit 406 decreases the setting value of the enlargement continuous shooting mode by one step. Since the aforementioned movement directions and the increment or decrement of the vertical size and/or the horizontal size of the document preview image corresponding to the movement directions are decided on the basis of a layout of the document preview image and the paper sheet preview image in the preview screen 700, relationships between the movement directions and the increment or decrement of the vertical size and/or the horizontal size can be arbitrarily designed.

Furthermore, in the aforementioned embodiment, the setting values of enlargement continuous shooting are "off", "A1", and "A0". For enlargement continuous shooting, another setting value such as "A2", "A1 wide" or "A0 wide" may be added.

Furthermore, in the aforementioned embodiment, the operation unit 102 is applied to the multifunction peripheral 100. Alternatively, this can be applied to other apparatuses which includes an operation unit (i.e. an operation device) having a touch panel, such as sorts of image forming apparatuses, sorts of image processing apparatuses, sorts of image editing apparatus, and sorts of image displaying apparatuses, in order to achieve the same actions and the same advantages.

Furthermore, in the aforementioned embodiment, a program may be stored in a recording medium to form the aforementioned units in the operation unit 102 of the multifunction peripheral 100, and a configuration may be available in which the recording medium may be provided. In such a configuration, the operation unit 102 or the multifunction peripheral 100 reads out the program and forms the aforementioned units according to the program. In such a case, the program itself read out from the recording medium brings actions and advantages of the present disclosure. Further, it is possible to provide a method in which a step executed by the aforementioned unit is stored in a hard disk. In such a case, a central processing unit (CPU) in the operation unit 102 performs a control action together with each of circuits other than the CPU in accordance with a program. Further, the units formed with the program and the CPU may be configured of specific hardware. Further, this program can be circulated as a computer readable recording medium such as a CD-ROM in which the program has been recorded.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An operation device configured to display on a touch panel a document preview image corresponding to document image data of a predetermined document size on a paper sheet preview image corresponding to a paper sheet with a predetermined paper sheet size, comprising:
   a changing unit configured to change a size of the document image data corresponding to the document preview image in accordance with a movement amount and a movement direction when a user touches a part of the document preview image and moves the touched part;
   a determining unit configured to determine whether or not a vertical size and a horizontal size of the document preview image after the change by the changing unit are larger than a vertical size and a horizontal size of a largest paper sheet preview image corresponding to a settable largest paper sheet size;
   an enlargement continuous shooting setting unit configured to set an enlargement continuous shooting mode if it is determined that the vertical size and the horizontal size of the document preview image that has been changed by the changing unit and corresponding to a page are larger than the vertical size and the horizontal size of the largest paper sheet preview image, the enlargement continuous shooting mode dividing a document image of the page based on the document image data corresponding to the document preview image into plural divisional images, enlarging the respective divisional images, and forming the enlarged divisional images on respective paper sheets;
   a displaying-receiving unit configured to display a document preview image for the enlargement continuous shooting mode; said document preview image for the enlargement continuous shooting mode showing the plural divisional images as each would look printed on a separate paper sheet;
   wherein the determining unit is further configured to determine whether or not a vertical size and a horizontal size of the document preview image for the enlargement continuous shooting mode are larger than a vertical size and a horizontal size of the set of the largest paper sheet preview images; and
   the enlargement continuous shooting setting unit is further configured to change a setting value to a value larger than a current value if it is determined that the vertical size and the horizontal size of the document preview image for the enlargement continuous shooting mode are larger than the vertical size and the horizontal size of the set of the largest paper sheet preview images; said setting value being the number of the largest paper sheet preview images being displayed for the plural division images.

2. The operation device according to claim 1, wherein:
the enlargement continuous shooting setting unit is further configured to change the setting value to a value smaller than a current value if it is determined that the vertical size and the horizontal size of the document preview image for the enlargement continuous shooting mode are either equal to or smaller than the vertical size and the horizontal size of the set of the largest paper sheet preview images.

3. The operation device according to claim 1,
wherein the displaying-receiving unit is configured to receive a setting value of the enlargement continuous shooting mode when a predetermined OK key is pressed under a status that the enlargement continuous shooting mode has been set.

4. An image forming apparatus comprising:
an operation device configured to display on a touch panel a document preview image corresponding to document image data of a predetermined document size on a paper sheet preview image corresponding to a paper sheet with a predetermined paper sheet size;
wherein the operation device comprises:
a changing unit configured to change a size of the document image data corresponding to the document preview image in accordance with a movement amount and a movement direction when a user moves a part of the document preview image while the user touches the part on the touch panel;
a determining unit configured to determine whether or not a vertical size and a horizontal size of the document preview image after the change by the changing unit are larger than a vertical size and a horizontal size of a largest paper sheet preview image corresponding to a settable largest paper sheet size;
an enlargement continuous shooting setting unit configured to set an enlargement continuous shooting mode if it is determined that the vertical size and the horizontal size of the document preview image are larger than the vertical size and the horizontal size of the largest paper sheet preview image, the enlargement continuous shooting mode dividing a document image based on the document image data corresponding to the document preview image into plural divisional images, enlarging the respective divisional images, and forming the enlarged divisional images on respective paper sheets; wherein the document image that is divided corresponds to one page; and
a displaying-receiving unit configured to display a document preview image for the enlargement continuous shooting mode; said document preview image for the enlargement continuous shooting mode showing the plural divisional images as each would look printed on a separate paper sheet;
wherein the determining unit is further configured to determine whether or not a vertical size and a horizontal size of the document preview image for the enlargement continuous shooting mode are larger than a vertical size and a horizontal size of the set of the largest paper sheet preview images; and
the enlargement continuous shooting setting unit is further configured to change a setting value to a value larger than a current value if it is determined that the vertical size and the horizontal size of the document preview image for the enlargement continuous shooting mode are larger than the vertical size and the horizontal size of the set of the largest paper sheet preview images; said setting value being the number of the largest paper sheet preview images being displayed for the plural division images.

5. The image forming apparatus according to claim 4,
wherein the determining unit is further configured to determine whether or not a vertical size and a horizontal size of the document preview image for the enlargement continuous shooting mode are larger than a vertical size and a horizontal size of the set of the largest paper sheet preview images; and
the enlargement continuous shooting setting unit is further configured to change the setting value to a value larger than a current value if it is determined that the vertical size and the horizontal size of the document preview image for the enlargement continuous shooting mode are larger than the vertical size and the horizontal size of the set of the largest paper sheet preview images; said setting value being the number of the largest paper sheet preview images being displayed for the plural division images.

6. The image forming apparatus according to claim 5, wherein:
the enlargement continuous shooting setting unit is further configured to change the setting value to a value smaller than a current value if it is determined that the vertical size and the horizontal size of the document preview image for the enlargement continuous shooting mode are either equal to or smaller than the vertical size and the horizontal size of the set of the largest paper sheet preview images.

7. The image forming apparatus according to claim 4, wherein:
the displaying-receiving unit is configured to receive a setting value of the enlargement continuous shooting mode when a predetermined OK key is pressed under a status that the enlargement continuous shooting mode has been set.

8. An operation method of an operation device configured to display on a touch panel a document preview image corresponding to document image data of a predetermined document size on a paper sheet preview image corresponding to a paper sheet with a predetermined paper sheet size, comprising the steps of:
changing a size of the document image data corresponding to the document preview image in accordance with a movement amount and a movement direction when a user touches a part of the document preview image and moves the touched part;
determining whether or not a vertical size and a horizontal size of the document preview image of a page after the change are larger than a vertical size and a horizontal size of a largest paper sheet preview image corresponding to a settable largest paper sheet size;
detecting whether or not a vertical size and a horizontal size of the document preview image for the enlargement continuous shooting mode are larger than a vertical size and a horizontal size of the set of the largest paper sheet preview images;
setting an enlargement continuous shooting mode if it is determined that the vertical size and the horizontal size of the document preview image of a page are larger than the vertical size and the horizontal size of the largest paper sheet preview image, the enlargement continuous shooting mode dividing a document image based on the document image data of a page corresponding to the document preview image into plural divisional images, enlarging the respective divisional images, and forming the enlarged divisional images on respective paper sheets; the enlargement continuous shooting mode further changes a setting value to a value larger than a current value if it is detected that the vertical size and the horizontal size of the document preview image for the enlargement continuous shooting mode are larger than the vertical size and the horizontal size of the set of the largest paper sheet preview images; said setting value being the number of the largest paper sheet preview images to be displayed for the plural division images and displaying a document preview image for the enlargement continuous shooting mode; said document preview image for the enlargement continuous shooting mode showing the plural divisional images as each would look printed on a separate paper sheet.

9. A non-transitory computer readable recording medium storing a program that causes a computer in an operation device configured to display on a touch panel a document preview image corresponding to document image data of a predetermined document size on a paper sheet preview image corresponding to a paper sheet with a predetermined paper sheet size to execute the steps of:

changing a size of the document image data corresponding to the document preview image in accordance with a movement amount and a movement direction when a user touches a part of the document preview image and moves the touched part;

determining whether or not a vertical size and a horizontal size of the document preview image after the change are larger than a vertical size and a horizontal size of a largest paper sheet preview image corresponding to a settable largest paper sheet size;

detecting whether or not a vertical size and a horizontal size of the document preview image for the enlargement continuous shooting mode are larger than a vertical size and a horizontal size of the set of the largest paper sheet preview images;

setting an enlargement continuous shooting mode if it is determined that the vertical size and the horizontal size of the document preview image are larger than the vertical size and the horizontal size of the largest paper sheet preview image, the enlargement continuous shooting mode dividing a document image based on the document image data corresponding to the document preview image into plural divisional images, enlarging the respective divisional images, and forming the enlarged divisional images on respective paper sheets; wherein the document image to be divided corresponds to a page; the enlargement continuous shooting mode further changes a setting value to a value larger than a current value if it is detected that the vertical size and the horizontal size of the document preview image for the enlargement continuous shooting mode are larger than the vertical size and the horizontal size of the set of the largest paper sheet preview images; said setting value being the number of the largest paper sheet preview images to be displayed for the plural division images and displaying a document preview image for the enlargement continuous shooting mode; said document preview image for the enlargement continuous shooting mode showing the plural divisional images as each would look printed on a separate paper sheet.

* * * * *